(12) United States Patent
Zhao et al.

(10) Patent No.: US 10,838,622 B2
(45) Date of Patent: Nov. 17, 2020

(54) METHOD AND APPARATUS FOR IMPROVING STORAGE PERFORMANCE OF CONTAINER

(71) Applicant: EMC IP Holding Company LLC, Hopkinton, MA (US)

(72) Inventors: Junping Zhao, Beijing (CN); Fan Guo, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 16/162,496

(22) Filed: Oct. 17, 2018

(65) Prior Publication Data

US 2019/0121541 A1     Apr. 25, 2019

(30) Foreign Application Priority Data

Oct. 20, 2017    (CN) .......................... 2017 1 0981975

(51) Int. Cl.
  *G06F 3/06*     (2006.01)
  *G06F 12/0868*  (2016.01)
(52) U.S. Cl.
  CPC ............ *G06F 3/061* (2013.01); *G06F 3/0643* (2013.01); *G06F 3/0647* (2013.01); *G06F 3/0664* (2013.01); *G06F 3/0673* (2013.01); *G06F 12/0868* (2013.01)
(58) Field of Classification Search
  CPC ...... G06F 3/061; G06F 3/0643; G06F 3/0647; G06F 3/0664; G06F 3/0673; G06F 3/0662; G06F 12/0868; G06F 12/084; G06F 12/0873; G06F 2212/152; G06F 2212/151; G06F 2212/15
  See application file for complete search history.

(56) References Cited

U.S. PATENT DOCUMENTS

| | | | |
|---|---|---|---|
| 2013/0132967 A1* | 5/2013 | Soundararajan | ........ H04L 67/06 718/104 |
| 2013/0198459 A1* | 8/2013 | Joshi | ................... G06F 12/0891 711/130 |
| 2014/0013059 A1* | 1/2014 | Joshi | ................... G06F 9/45558 711/144 |
| 2017/0147497 A1* | 5/2017 | Phelan | ................ G06F 12/0868 |
| 2018/0025022 A1* | 1/2018 | Van Riel | ............... G06F 16/185 707/620 |

* cited by examiner

*Primary Examiner* — Tracy A Warren
(74) *Attorney, Agent, or Firm* — Ryan, Mason & Lewis, LLP

(57) ABSTRACT

Embodiments of the present disclosure provide a computer-implemented method and an apparatus for a storage system. The method comprises: in response to receiving a read request of a first container for data in a storage device, obtaining an identifier associated with the read request; searching for metadata of the read request in a metadata set based on the identifier, the metadata recording addressing information of the read request, the metadata set including metadata of access requests for the storage device during a past period; and in response to finding the metadata of the read request in the metadata set, determining, based on the metadata, a cached page of a second container storing the data; and providing the cached page from the second container to the first container to avoid reading the data from the storage device.

20 Claims, 10 Drawing Sheets

METHOD AND APPARATUS FOR IMPROVING STORAGE PERFORMANCE OF CONTAINER

RELATED APPLICATIONS

This application claims priority from Chinese Patent Application Number CN 201710981975.0, filed on Oct. 20, 2017 at the State Intellectual Property Office, China, titled "METHOD AND APPARATUS FOR IMPROVING STORAGE PERFORMANCE OF CONTAINER" the contents of which is herein are incorporated by reference herein in its their entirety.

FIELD

The present disclosure generally relates to a computer system or a storage system, and more specifically, to a method and an apparatus for improving storage performance of a container.

BACKGROUND

Recently, after the emergence of virtualization technologies, container technology has gradually become a revolutionary technology with far-reaching impact on computing fields (especially a cloud computing field). The development and application of the container technology provide new ideas for an application of cloud computing. Meanwhile, the container technology also has a profound impact on the delivery manner of the cloud computing, the efficiency thereof, and the construction of a platform as a service (PaaS). The container (e.g. Docker etc.) makes it possible to develop, operate, and maintain in a lighter, faster and easier services. Although the performance of the container is usually relatively good, it still depends heavily on workload and an underlying storage driver.

Generally speaking, depending on where Copy-On-Write is implemented, there are two types of the storage driver of the container, file-based type or block-based type. The file-based type of the storage driver includes, for instance, another union file system (AUFS) and Overlay/2 etc., while the block-based type of storage driver (hereinafter referred to as block storage driver) includes, for instance, DevMapper and zettabyte file system (ZFS) etc. However, the existing block storage driver for containers still has various defects and deficiencies in storage performance and cannot meet the performance requirement of the computing system or storage system in many scenarios.

SUMMARY

The present disclosure provides a computer-implemented method and an apparatus for a storage system.

In a first aspect of the present disclosure, there is provided a computer-implemented method, comprising: in response to receiving a read request of a first container for data in a storage device, obtaining an identifier associated with the read request; searching for metadata of the read request in a metadata set based on the identifier, the metadata recording addressing information of the read request, the metadata set including metadata of access requests for the storage device during a past period; and in response to finding the metadata of the read request in the metadata set, determining, based on the metadata, a cached page of a second container storing the data; and providing the cached page from the second container to the first container to avoid reading the data from the storage device.

In some embodiments, the method further comprises: in response to failing to find the metadata in the metadata set, reading the data from the storage device; and adding the metadata into the metadata set.

In some embodiments, obtaining the identifier associated with the read request comprises: translating a virtual device identifier and a virtual logical block number associated with the read request into a real device identifier and a real logical block number associated with the read request.

In some embodiments, searching for the metadata of the read request in the metadata set based on the identifier comprises: selecting an index table corresponding to the real device identifier; and using the real logical block number as a key to look up the metadata in the index table.

In some embodiments, the metadata comprises metadata at a block layer and metadata at a file layer.

In some embodiments, providing the cached page from the second container to the first container comprises: duplicating or migrating the cached page from the second container to the first container.

In some embodiments, the method further comprises: determining whether to duplicate or migrate the cached page to the first container based on at least one of an access frequency of the cached page, an access characteristic of the cached page, and remaining space of a memory that the cached page resides in.

In some embodiments, the method further comprises: if the cached page is duplicated from the second container to the first container, adding the metadata to the metadata set; and if the cached page is migrated from the second container to the first container, modifying the metadata set with the metadata.

In some embodiments, the method further comprises: in response to the cached page being modified or deleted in the first container after being migrated to the first container, returning the cached page to the second container.

In some embodiments, the method further comprises: in response to the cached page of the second container storing the data and a state of the cached page being clean, providing the cached page from the second container to the first container.

In some embodiments, the method further comprises: in response to the cached page of the second container storing the data and a state of the cached page being dirty, deleting metadata associated with the cached page in the metadata set; reading the data from the storage device; and adding the metadata of the read request to the metadata set.

In a second aspect of the present disclosure, there is provided an apparatus for a storage system, comprising: at least one processor; and at least one memory storing computer program instructions. The at least one memory and the computer program instructions are configured to, with the at least one processor, cause the apparatus to: in response to receiving a read request of a first container for data in a storage device, obtain an identifier associated with the read request; search for metadata of the read request in a metadata set based on the identifier, the metadata recording addressing information of the read request, the metadata set including metadata of access requests for the storage device during a past period; and in response to finding the metadata of the read request in the metadata set, determine, based on the metadata, a cached page of a second container storing the data; and provide the cached page from the second container to the first container to avoid reading the data from the storage device.

In some embodiments, the at least one memory and the computer program instructions are further configured to, with the at least one processor, cause the apparatus to: in response to failing to find the metadata in the metadata set, read the data from the storage device; and add the metadata into the metadata set.

In some embodiments, the at least one memory and the computer program instructions are further configured to, with the at least one processor, cause the apparatus to: translate a virtual device identifier and a virtual logical block number associated with the read request into a real device identifier and a real logical block number associated with the read request.

In some embodiments, the at least one memory and the computer program instructions are further configured to, with the at least one processor, cause the apparatus to: select an index table corresponding to the real device identifier; and use the real logical block number as a key to look up the metadata in the index table.

In some embodiments, the metadata comprises metadata at a block layer and metadata at a file layer.

In some embodiments, the at least one memory and the computer program instructions are further configured to, with the at least one processor, cause the apparatus to: duplicate or migrate the cached page from the second container to the first container.

In some embodiments, the at least one memory and the computer program instructions are further configured to, with the at least one processor, cause the apparatus to: determine whether to duplicate or migrate the cached page to the first container based on at least one of an access frequency of the cached page, an access characteristic of the cached page, and remaining space of a memory that the cached page resides in.

In some embodiments, the at least one memory and the computer program instructions are further configured to, with the at least one processor, cause the apparatus to: if the cached page is duplicated from the second container to the first container, add the metadata to the metadata set; and if the cached page is migrated from the second container to the first container, modify the metadata set with the metadata.

In some embodiments, the at least one memory and the computer program instructions are further configured to, with the at least one processor, cause the apparatus to: in response to the cached page being modified or deleted in the first container after being migrated to the first container, return the cached page to the second container.

In some embodiments, the at least one memory and the computer program instructions are further configured to, with the at least one processor, cause the apparatus to: in response to the cached page of the second container storing the data and a state of the cached page being clean, provide the cached page from the second container to the first container.

In some embodiments, the at least one memory and the computer program instructions are further configured to, with the at least one processor, cause the apparatus to: in response to the cached page of the second container storing the data and a state of the cached page being dirty, delete metadata associated with the cached page in the metadata set; read the data from the storage device; and add the metadata of the read request to the metadata set.

In a third aspect of the present disclosure, there is provided a computer program product tangibly stored on a non-transient computer readable medium and including machine executable instructions, the instructions, when executed, cause a machine to execute steps of the method according to the first aspect.

BRIEF DESCRIPTION OF THE DRAWINGS

The above and other objectives, features, and advantages of example embodiments of the present disclosure will become more apparent through the more detailed description of the example embodiments of the present disclosure with reference to the accompanying drawings. Several example embodiments of the present disclosure will be illustrated by way of example but are not limited to the drawings in which.

Throughout the drawings, the same or similar reference symbols represent the same or similar elements.

DETAILED DESCRIPTION OF EMBODIMENTS

Figure 1:
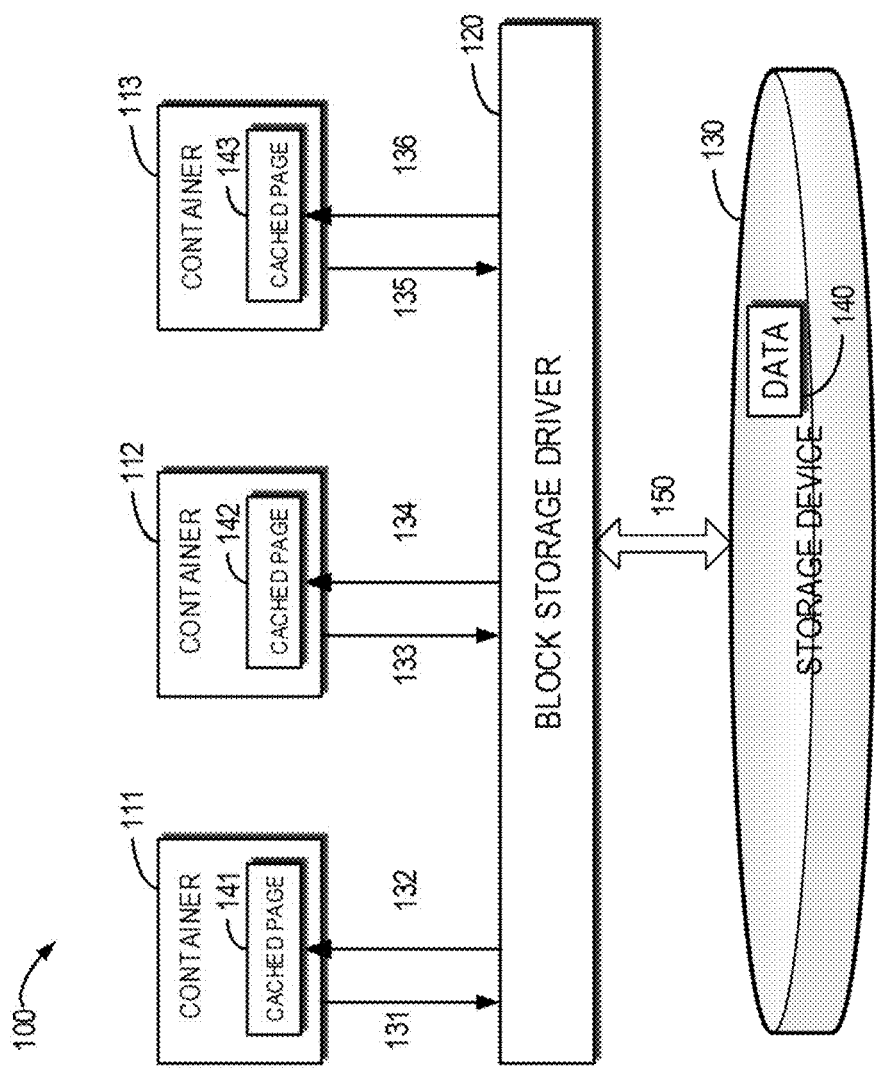
FIG. 1 is a schematic diagram of a container performing reading operation through a block storage driver in an existing storage system.

Principles and spirits of the present disclosure will now be described with reference to various example embodiments illustrated in the drawings. It should be appreciated that the description of those embodiments is merely to enable those skilled in the art to better understand and further implement the present disclosure and is not intended for limiting the scope disclosed herein in any manner.

As mentioned above, the container (such as Docker) may be considered as lightweight operating system (OS) virtualization for lighter, faster and easier service construction and operation. Generally, the container is built on a plurality of image layers. To manage these read-only images efficiently and provide a writable layer to (multiple) running containers, the container leverages some existing storage technologies (such as storage driver) to provide a Copy-On-Write (CoW) snapshot mechanism.

Generally, depending on where the Copy-On-Write is implemented, there are two types of storage drivers. One is file-based storage driver, such as AUFS, Overlay file system (FS)/Overlay 2 and virtual file system (VFS), and the other is block-based storage driver, such as DevMapper, zettabyte file system (ZFS) and Btrfs. Note that the block-based storage driver is a snapshot at the block layer level. Different types of drivers have different characteristics and thus, have different IO performance, memory efficiency and storage efficiency.

Compared with file storage drivers, block storage drivers generally have better storage efficiency and writing performance. However, their memory efficiency and read performance are suboptimal, especially when many containers are launched. For example, DevMapper is a popular block storage driver and a default choice in CentOS, Red Hat Enterprise Linux (RHEL), Fedora and Oracle Linux systems. However, if there are multiple containers on DevMapper, when the same data is read, these containers may generate many redundant read requests for the storage disk and generate redundant cached pages in each container.

Table 1 below shows a simple comparison between a block storage driver and a file storage driver.

TABLE 1

| | Block storage driver | File storage driver |
| --- | --- | --- |
| I/O | good writing performance: block-level CoW bad reading performance: cannot share page cache | good reading performance: share page cache bad writing performance: File level CoW |
| Memory efficiency | bad: Multiple copies of data in page cache | good: Share copy of data in page cache |
| Storage efficiency | good: CoW at block level | bad: CoW the whole file |

As can be seen from Table 1, compared with a file storage driver, a block storage driver has poorer read performance and memory efficiency. The root reason thereof is that cached pages cannot be shared between multiple containers, so that the block storage driver needs to read data more from the storage device, even if the data to be read is already stored in a cached page of the other container. Besides, the fact that a plurality of containers cannot share a cached page further causes a plurality of containers that need to read the same data to create a plurality of identical cached pages in the memory, resulting in greater occupation of the memory. The specific process of reading data from an existing block storage driver by a plurality of containers and the problems in the existing block storage driver will be explained below in detail with reference to FIG. 1.

FIG. 1 is a schematic diagram of containers 111-113 performing reading operation through a block storage driver 120 in an existing storage system 100. As illustrated in FIG. 1, the storage system 100 includes containers 111-113, a block storage driver 120 and a storage device 130. Containers 111-113 may read data 140 from the storage device 130 through the block storage driver 120. It is to be understood that although FIG. 1 illustratively shows that the storage system 100 includes three containers 111-113, in other embodiments, the storage system 100 may have more or fewer containers.

Taking the container 111 as an example, when the container 111 needs to read data 140 from the storage device 130 through the block storage driver 120, the container 111 sends a read request 131 to the block storage driver 120. After receiving the read request 131, the block storage driver 120 obtains the data 140 that the read request 131 is targeted for through an interaction 150 with the storage device 130 based on the addressing information contained in the read request 131 and returns 132 the data 140 to the container 111.

The container 111 caches the data 140 received from the block storage driver 120 into a cached page 141 which has a particular dimension and may correspond to the particular data block at the block layer. If the container 111 needs to read the data 140 again within a short period of time, it may obtain the data 140 directly from the cached page 141 without accessing the storage device 130 through the block storage driver 120.

Likewise, assuming that containers 112 and 113 also need to read the data 140, they may send read requests 133 and 135 to the block storage driver 120 and receive 134, 136 the data 140 from the block storage driver 120, and may further store the data 140 in their respective cached pages 142, 143.

As mentioned above, the block storage driver 120 (such as DevMapper) operates at the block level. Therefore, above the block storage driver 120, containers 111-113 create their respective file systems (not shown) and their respective cached pages 141-143. However, containers 111-113 cannot share these cached pages 141-143, even if these cached pages 141-143 may be read from the same block of the storage device 140. In this case, a redundant reading operation for the storage device 130 is introduced in the block storage driver 120 and thereby degrading the reading performance.

Moreover, when containers 111-113 use the block storage driver 120, they would generally share a mirror image to save the storage space of the storage device 130. Therefore, the same data blocks of the storage device 130 having data 140 may be cached repetitively by a plurality of containers 111-113 and further generate a plurality of identical cached pages in the memory (not shown) in which the cached pages 141-143 are located. This potentially wastes the storage space of the memory of the cached pages 141-143. For example, in the case that the block storage driver 120 has hundreds of instances, the occupation of a block (4 KB-8 KB) may be amplified by hundred times, thereby causing considerable memory occupation.

Embodiments of the present disclosure will solve the above technical problem. To achieve this, embodiments of the present disclosure at least overcome the following technical challenges. First of all, embodiments of the present disclosure can detect redundant read requests to the storage device 130 from different containers (such as containers 111-113) accurately and efficiently. Moreover, after the redundant read requests are determined, it can be determined the which container having a cached page stores the data 140 that the read request 131 is targeted for, and the cached page having this data can be shared between different containers. Secondly, embodiments of the present disclosure can achieve a trade-off between memory efficiency and read operation performance. As will be depicted below, the above various technical problems and challenges will be solved through the embodiments of the present disclosure. An improved storage system and method according to some embodiments of the present disclosure will be depicted below with reference to FIGS. 2 and 3.

Figure 2:
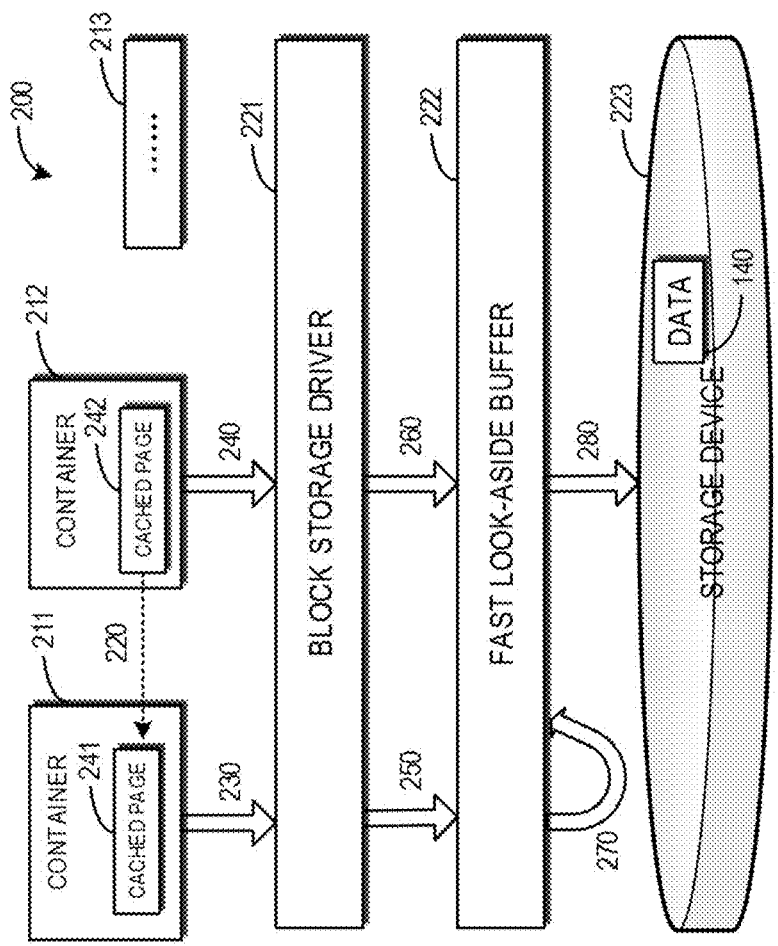
FIG. 2 is a schematic diagram of a container performing reading operation through a block storage driver in a storage system according to some embodiments of the present disclosure.

FIG. 2 is a schematic diagram of containers 211-213 in a storage system 200 performing reading operation through a block storage driver 221. As shown in FIG. 2, different from the existing storage system 100, the storage system 200 additionally includes a fast look-aside buffer (FLB) 222 to solve the above technical problems and challenges without performing costly re-design to the block storage driver 221.

In some embodiments, the fast look-aside buffer (FLB) 222 may operate together with the block storage driver 221 and the system cache (or memory, page cache) in the kernel space.

As shown in FIG. 2, reference symbols 230, 250, 270 and 220 are used to describe that the storage system 200 may determine the redundant read request 230 from the container 211 through the fast look-aside buffer 222 to avoid 270 redundant access to the storage device 223. Besides, the reference signs 240, 260 and 280 are used in FIG. 2 to depict the case in which when the read request 240 from the container 212 is determined by the fast look-aside buffer 222 as non-redundant, the read request is transmitted 260 via the block storage driver 221 to the fast look-aside buffer 222 and further transmitted 280 by the fast look-aside buffer 222 to the storage device 223. The operation of the storage system 200 and each of the components in these two scenarios will be depicted below in detail with reference to FIG. 3.

Figure 3:
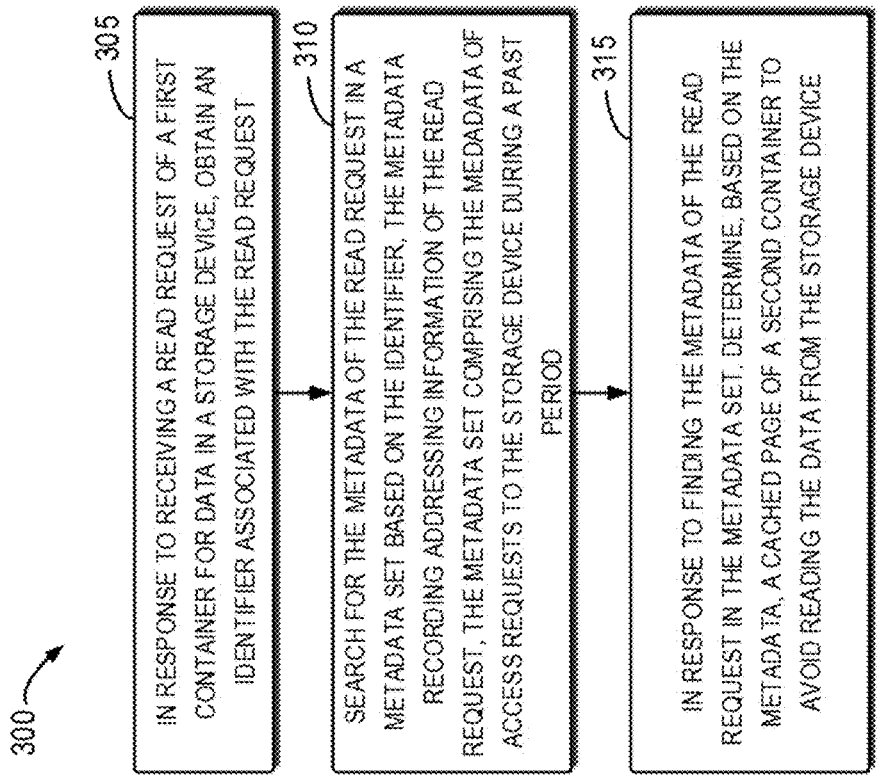
FIG. 3 is a schematic flowchart illustrating a storage method according to some embodiments of the present disclosure.

FIG. 3 is a schematic flowchart of a storage method 300 according to some embodiments of the present disclosure. In some embodiments, the method 300 may be performed by the storage system 200 depicted in FIG. 2, for instance, may be performed by the units or components in the storage system 200.

At step 305, in response to receiving a read request 230 of the container (such as container 211) for data 140 in the storage device 223, the block storage driver 221 obtains an identifier 250 associated with the read request 230 and sends it to the fast look-aside buffer 222. In some embodiments, the identifier 250 may also be obtained by the fast look-aside buffer 222 from the read request 230. In this case, the block storage driver 221 forwards the read request 230 to the fast look-aside buffer 222.

As described below in detail, the fast look-aside buffer 222 may determine whether the read request 230 is a redundant read request based on the identifier 250. In the case that the read request 230 is determined as redundant, the fast look-aside buffer 222 may use the identifier 250 to determine the metadata of the read request 230 which logs the addressing information of the read request 230, so as to further determine which other container with the cached page (for example, containers 212-213) stores the data that the read request 230 is targeted for.

Generally, the block storage driver 221 maps the storage device 223 to a plurality of virtual devices and provides different virtual device identifiers and virtual logical block numbers to different containers (such as containers 211-213). Therefore, the read request 230 from the container 211 will carry the virtual device identifier and virtual logical block number of its access target. If the virtual device identifier (ID) and virtual logical block number (vLBN) are translated into a real device identifier (ID) and a real logical block number (also referred to as physical block number PBN) in the block storage driver 221, the real device identifier and the real logical block number of the read request 230 can be compared with the real device identifier and the real logical block number of the previous access request to determine if the read request 230 is redundant.

Therefore, in some embodiments, the fast look-aside buffer 222 may use the real device identifier and real logical block number of the access target of the read request 230 as the identifier 250 associated with the read request 230. To obtain the identifier 250, the block storage driver 221 may translate the virtual device identifier and the virtual logical block number associated with the read request 230 into a real device identifier and a real logical block number associated with the read request 230. In some embodiments, the translation operation may also be performed by the fast look-aside buffer 222.

At step 310, the fast look-aside buffer 222 may search for the metadata of the read request 230 in the metadata set based on the identifier 250. As stated above, the metadata records the addressing information of the read request 230. Therefore, it may be determined if the read request 230 is a redundant read request through the metadata. Moreover, the metadata set here includes metadata of access requests to the storage device 223 during a past period of time.

For example, the container 212 accesses the storage device 223 before a period of time (for instance, five minutes), and then the access request (read request or writing request) of the container 212 may be added to the metadata set. It is to be understood that the period of five minutes and the particular container are only examples, not intending to limit in any manner the scope of the embodiments of the present disclosure. In other embodiments, those skilled in the art may configure a time period with another length based on actual conditions and the recent access requests of other containers may also be included in the metadata set.

In some embodiments, the metadata may include the metadata at the block layer and metadata at the file layer. Correspondingly, the metadata set may also include the metadata set at the block layer and the metadata set at the file layer. Example organization forms of the two kinds of metadata and metadata sets are depicted below in detail with reference to FIGS. 4 and 5.

Figure 4:
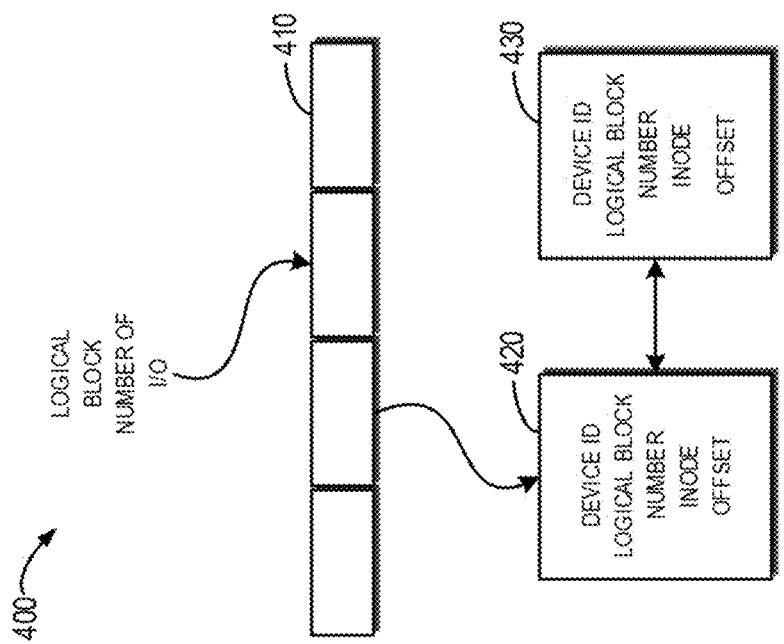
FIG. 4 is a schematic diagram illustrating a metadata set at a block layer according to some embodiments of the present disclosure.

FIG. 4 is a schematic diagram illustrating a metadata set 400 at the block layer according to some embodiments of the present disclosure. As shown in FIG. 4, in some embodiments, the metadata 420, 430 and so on at the block layer may include addressing information such as device identifier, logical block number, inode and offset. The reasons for using these addressing information are as follows.

In the storage system 200, the cached page of the file may be organized as a radix tree in the memory while the root of the radix tree is stored in inode of the file. Besides, the offset of the cached page in the file is used as an index of the radix tree. Therefore, particular metadata may be found through the device identifier and the logical block number, while a particular cached page may be further found through the inode and offset included in the particular metadata. Furthermore, as shown in FIG. 4, the metadata 420, 430 may be organized in the form of an index table (such as hash table) 410. In some embodiments, each of the storage devices in the storage system 200 may have its own index table (such as hash table).

It is to be understood that the organization form of the metadata set 400 and content of the metadata 420, 430 and so on depicted in FIG. 4 are only examples, not intending to limit the embodiments of the present disclosure in any manner. In other embodiments, the metadata set 400 may also be organized in any other proper manner while metadata 420, 430 may include any other proper addressing information.

Under the organization of the index table 410 in FIG. 4, the fast look-aside buffer 222 may select the index table 410 corresponding to the real device identifier and then use the real logical block number as key to look up the metadata 420 of the read request 230 in the index table 410.

In some further embodiments, to reduce the long call stack path from the file layer to the block layer to further improve the performance, the embodiments of the present disclosure may further maintain a shadow copy of metadata at the file layer or page cache layer, so that searching can be performed quickly without accessing the block layer all the time, thus skipping any IO scheduler. The embodiments as such will be described below in detail with reference to FIG. 5.

Figure 5:
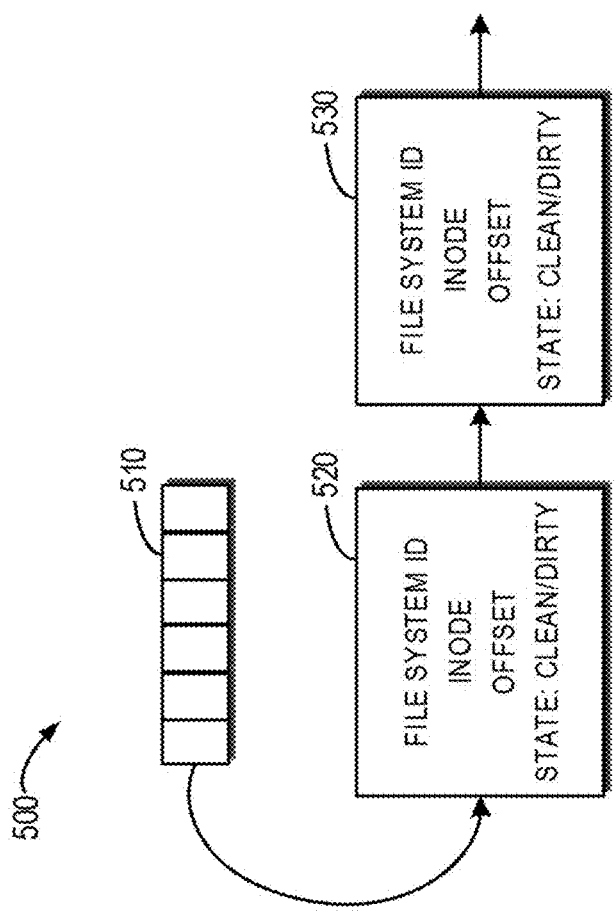
FIG. 5 is a schematic diagram illustrating a metadata set at a file layer according to some embodiments of the present disclosure.

FIG. 5 is a schematic diagram illustrating a metadata set 500 at the file layer according to some embodiments of the present disclosure. As shown in FIG. 5, in some embodiments, the metadata 520, 530 etc. at the file layer may include a file system identifier, an inode, an offset, a clean/dirty state and the like. Moreover, as shown in FIG. 5, the metadata 520, 530 etc. may be organized in the form of an index table (such as hash table) 510.

The file-layer metadata 520, 530 etc. may be shared between file systems, hence being global. Items in the metadata 520, 530 etc. are added only when the block layer confirms the redundant access request and these items can be queried quickly and removed (for instance, when the page is dirty) at the file layer. Comparing with the metadata 420, 430 ect. at the block layer, the metadata 520, 530 etc. at the file layer achieve faster reading performance at the expense of greater occupation of the memory.

It should be noted that the organization form of the metadata set 500 and content of the metadata 520, 530 etc. depicted in FIG. 5 are only examples, rather than to limit the embodiments of the present disclosure in any manner. In other embodiments, the metadata set 500 may also be organized in any other proper form while metadata 520, 530 etc. may include other proper addressing information.

Returning to refer to FIG. 3, at 315, in response to finding the metadata 420 (or 520) of the read request 230 in the metadata set 400 (or 500), the fast look-aside buffer 222 determines, based on the metadata 420 (or 520), the cached page 242 of the container (such as container 212) storing the data 140.

After the cached page 242 of the container 212 is determined, the container 212 provides the cached page 242 to the container 211. As the cached page 242 stores the data 140 that the read request 230 is targeted for, after the cached page 242 is provided 220 to the container 211, the container 211 may read the data 140 from its own cached page 241 (having the same content as the cached page 242), thereby avoiding 270 reading the data 140 from the storage device 223.

Furthermore, in some embodiments, before the cached page 242 is provided 220 to the container 211, the clean/dirty state of the cached page 242 may be checked first. For example, in response to the cached page 242 of the container 212 storing the data 140 and the state of the cached page 242 being clean, the cached page 242 may be provided 220 from the container 212 to the container 211. On the other hand, in response to the cached page 242 of the container 212 storing the data 140 and the state of the cached page 242 being dirty, the metadata 420 (or 520) associated with the cached page 242 in the metadata set 400 (or 500) may be deleted, and then the data 140 may be read from the storage device 223 and the metadata of the read request 230 are added to the metadata set 400 (or 500) to facilitate the other containers to use the data 140 in the subsequent access.

In some conditions, if the metadata 420 (or 520) are not found in the metadata set 400 (or 500), then the fast look-aside buffer 222 may read data 140 from the storage device 223. In this case, it is also possible to add the metadata of the read request 230 to the metadata set 400 (or 500) to facilitate the other containers to use the data 140 in the subsequent access.

Additionally, in some embodiments of the present disclosure, when it is necessary to provide the cached page 242 to the container 211, the container 212 may duplicate or migrate the cached page 242 to the container 211. In other words, the embodiments of the present disclosure provide two approaches, namely, duplication approach and migration approach, to provide data 140 from the source cached page 242 to the target container 211. These two ways will be described below with reference to FIGS. 6 and 7, respectively.

Figure 6:
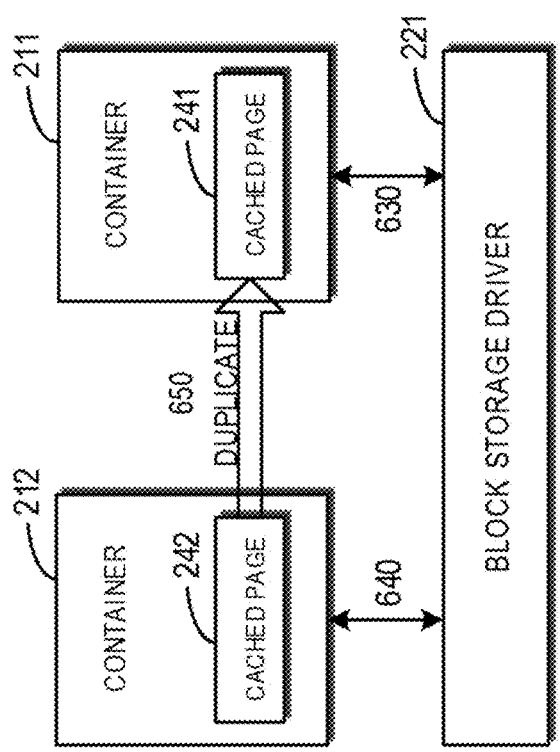
FIG. 6 is a schematic diagram illustrating duplicating a cached page from one container to another container according to some embodiments of the present disclosure.

FIG. 6 is a schematic diagram of duplicating 650 the cached page 242 from the container 212 to the container 211 according to some embodiments of the present disclosure. As shown in FIG. 6, the container 211 sends a read request 230 for the data 140 through an interaction 630 with the block storage driver 221, while the container 212 learns, through an interaction 640 with the block storage driver 221, that it is necessary to duplicate 650 the cached page 242 containing the data 140 to the container 211, to form a cached page 241. Then, the container 211 may read the data 140 from the cached page 241. Furthermore, in some embodiments, if the cached page 242 is duplicated from the container 212 to the container 211, then the metadata of the read request 230 may be added to the metadata set 400 (or 500).

Figure 7:
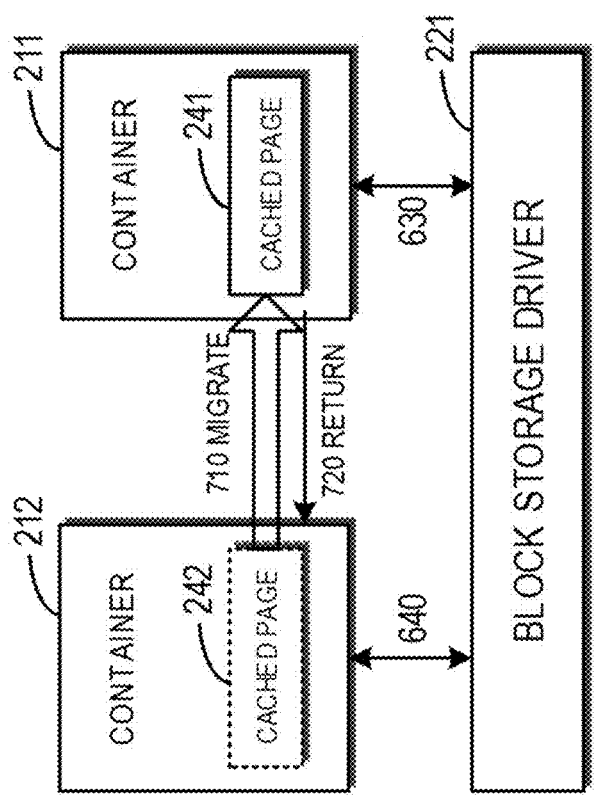
FIG. 7 is a schematic diagram illustrating migrating a cached page from one container to another container according to some embodiments of the present disclosure.

FIG. 7 is a schematic diagram of migrating 710 the cached page 242 from the container 212 to the container 211. As shown in FIG. 7, the container 211 sends a read request 230 for the data 140 through the interaction 630 with the block storage driver 221 while the container 212 learns, through the interaction 640 with the block storage driver 221, that it is necessary to migrate 710 the cached page 242 containing the data 140 to the container 211 to form a cached page 241. It is noted that different from "duplicate 650" depicted in FIG. 6, "migrate 710" here implies that the cached page 242 is deleted from the container 212, thereby releasing the storage space of the cached page 242. Then, the container 211 may read the data 140 from the cached page 241.

Moreover, as shown in FIG. 7, in some embodiments, in response to the cached page 242 being modified or evicted (for instance, being swapped) in the container 211 after being migrated to the container 211, the cached page 242 may be returned 720 to the container 212, which may be implemented by maintaining a list of container(s) that own the cached page 242 in recent history. Besides, if the cached page 242 is migrated from the container 212 to the container 211, then the metadata of the read request 230 may be used to modify the metadata set 400 (or 500). For example, the metadata 420 (or 520) originally pointing to the container 212 are modified to point to the container 211.

As can be known from the above depiction, the duplication approach in FIG. 6 generates repetitive duplicates in the memory, namely, cached pages 241 and 242. If both the cached pages 241 and 242 have high access frequency, then maintaining the repetitive duplicates in the memory is beneficial for IO performance. However, this approach may waste the storage space of the memory. Conversely, the migration approach shown in FIG. 7 only maintains a single duplicate for each data block in the memory, which saves the storage space of the memory. However, in the case that the cached page 241 (or 242) is continuously accessed by both the containers 211 and 212, the migration approach may cause the cached page 241 (or 242) being migrated too frequently between the containers 211 and 212, which would degrade the performance.

To achieve a trade-off between memory efficiency and IO performance, embodiments of the present disclosure provide a scheme for managing repetitive duplicates of cached page in a memory. In particular, when a redundant read request 230 is processed, the fast look-aside buffer 222 may first check the access frequency of the cached page 242 as source. If the access frequency of the cached page 242 is low, the fast look-aside buffer 222 may migrate it to the cached page 241 of the container 211. Otherwise, the fast look-aside buffer 222 may duplicate the cached page 242 to the cached page 241 of the container 211.

On the other hand, when the storage space of the memory gets pressured, maintaining many repetitive duplicates of the cached page may evict other cached pages and reduce the hit ratio of finding the cached page in the memory and degrade IO performance. Thus, the fast look-aside buffer 222 may scan all the cached pages and swap out repetitive cached pages and cached pages with lower access frequency (cold pages) when the remaining space of the memory reaches a particular threshold (for instance, 10%).

Besides, if a certain data block is accessed by a plurality of containers (such as containers 211-213) frequently but its corresponding cached page is often in the dirty state, then the fast look-aside buffer 222 may save a clean duplicate of the data block in its own storage space without adding it to the cached pages 241-243 of the containers 211-213.

That is to say, the fast look-aside buffer 222 may determine whether to duplicate 650 or migrate 710 the cached page 242 to the container 211 based on at least one of the access frequency of the cached page 242, the access characteristic of the cached page 242 and the remaining space of the memory that the cached page 242 resides in. In this manner, the fast look-aside buffer 222 may mix the duplication approach and migration approach depicted in FIGS. 6 and 7 depending on various factors. In other words, assuming that N containers share a specific cached page, then at a specific time, there may exist M duplicates of the cached page in the memory, where the value of M is between 1 and N.

As can be known from the above depiction, since the fast look-aside buffer 222 and the corresponding operation are added to the storage system 200 in addition to the existing storage system 100, in the storage system 200 according to some embodiments of the present disclosure, when a container (such as container 211) needs to read data 140, it will have a different flow than the one in the storage system 100. The specific flow of reading data 140 after the fast look-aside buffer 222 being included in the storage system 200 will be described below with reference to FIG. 8.

Figure 8:
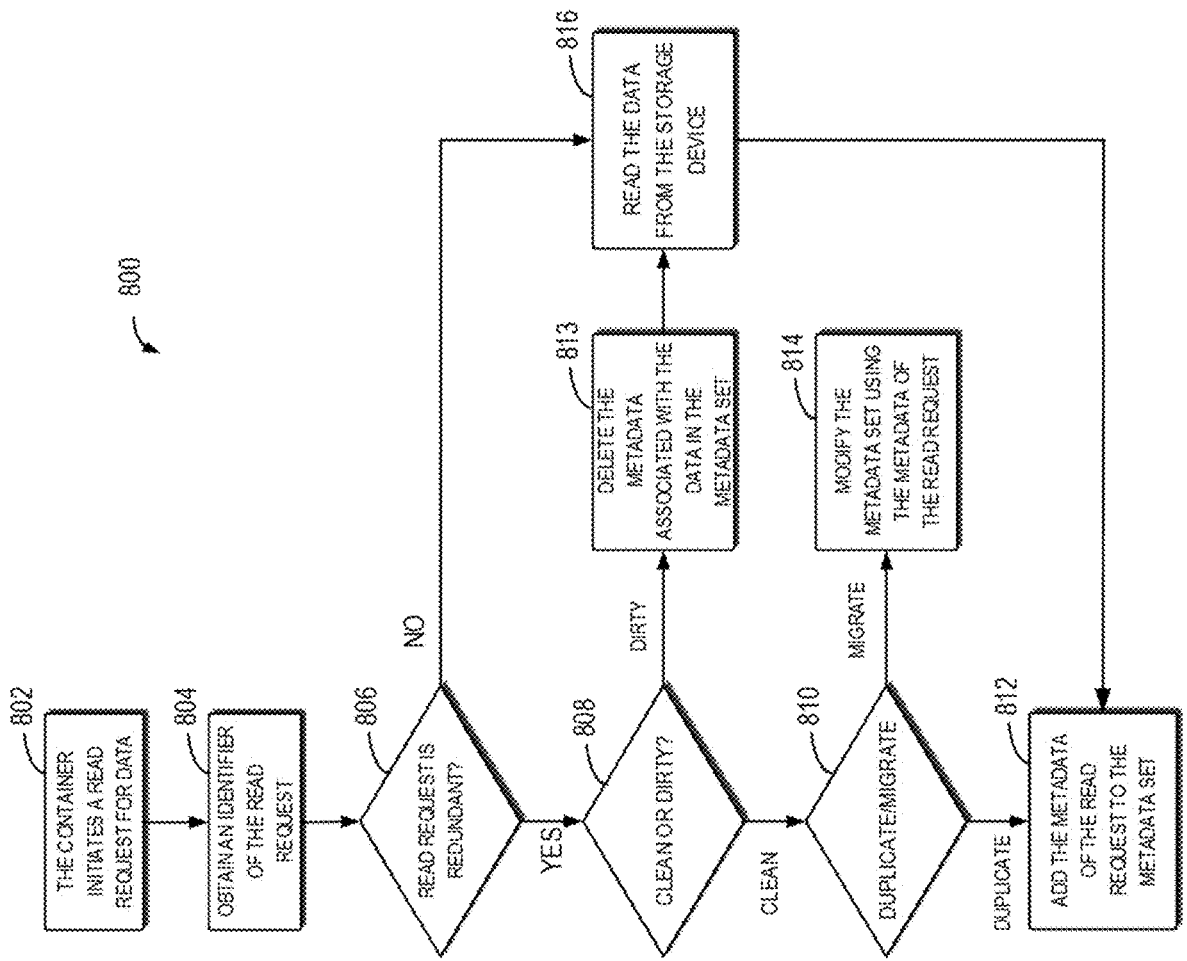
FIG. 8 is a schematic flowchart illustrating a method for reading data from a container according to some embodiments of the present disclosure.

FIG. 8 is a schematic flowchart illustrating a method 800 for reading data 140 in the container 211 according to some embodiments of the present disclosure. In the flowchart shown in FIG. 8, the metadata set 400 and the metadata 420, 430 at the block layer depicted in FIG. 4 will be used as an example for depiction.

As shown in FIG. 8, at block 802, the container 211 initiates a read request 230 for data 140. At block 804, the block storage driver 221 obtains an identifier 250 of the read request 230. In some embodiments, the identifier 250 may be a real device identifier and real logical block number associated with the read request 230. For example, the block storage driver 221 or the fast look-aside buffer 222 may translate the virtual device identifier and virtual logical block number of the read request 230 to the real device identifier and real logical block number of the read request 230 to obtain the identifier 250.

At block 806, the fast look-aside buffer 222 may determine whether the read request 230 is redundant based on the identifier 250 of the request 230. In particular, the fast look-aside buffer 222 searches for the metadata 420 of the read request 230 in the metadata set 400 based on the identifier 250. If the metadata 420 are found in the metadata set 400, it may be determined that the read request 230 is redundant and it is further determined based on metadata 420 that the data 140 are stored in the cached page 242 of the container 212. Then, the method 800 proceeds to block 808.

At block 808, the fast look-aside buffer 222 determines the clean/dirty state of the cached page 242. If it is determined that the cached page 242 is clean, then the method 800 proceeds to block 810. At block 810, the fast look-aside buffer 222 determines, based on one or a combination of the access frequency of the cached page 242, the access characteristic of the cached page 242 and the remaining space of the memory that the cached page 242 resides in, whether to use the duplication approach or the migration approach to provide 220 the cached page 242 from the container 212 to the container 211.

If the duplication approach is selected, then method 800 proceeds to block 812. At block 812, after duplication is completed, the metadata of the read request 230 is added to the metadata set 400. If the migration approach is selected, then method 800 proceeds to block 814. At block 814, after migration is completed, the metadata of the read request 230 is used to modify the metadata set 400. For example, the metadata 420 pointing to the container 212 is modified to point to the container 211.

Besides, if it is determined at block 806 that the read request 230 is not redundant, then method 800 proceeds to block 816. At block 816, the data 140 is read from the storage device 223. Then, the method 800 proceeds to block 812 where the metadata of the read request 230 is added to the metadata set 400.

Moreover, if it is determined at block 808 that the state of the cached page 242 is dirty, then method 800 proceeds to block 813 where the metadata 420 associated with data 140 in the metadata set 400 is deleted. Next, the method 800 proceeds to block 816 where the data 140 is read from the storage device 223. Then, the method 800 proceeds to block 812 where the metadata of the read request is added to the metadata set 400.

Figure 9:
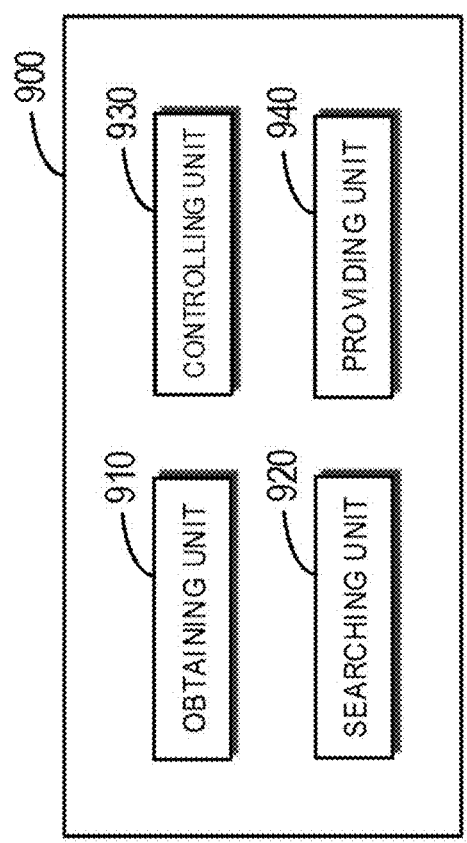
FIG. 9 is a schematic block diagram illustrating an apparatus for a storage system according to some embodiments of the present disclosure.

FIG. 9 is a schematic diagram illustrating an apparatus 900 for a storage system according to some embodiments of the present disclosure. It is to be understood by those skilled in the art that FIG. 9 only illustrates units or components in apparatus 900 closely associated with the present disclosure. In some embodiments, the apparatus 900 may further include other functional units or components that enable its normal operation. Moreover, the units or the components shown in FIG. 9 may be connected where necessary. However, for the sake of clarity, these connection relations are not depicted in FIG. 9. In some embodiments, the apparatus 900 may be configured to implement the method 300 depicted above in combination with FIG. 3.

As shown in FIG. 9, the apparatus 900 includes an obtaining unit 910, a searching unit 920, a controlling unit 930 and a providing unit 940. The obtaining unit 910 is configured to obtain an identifier 250 associated with a read request in response to receiving the read request of the first container for data in a storage device. The searching unit 920 is configured to search for metadata of the read request in the metadata set based on the identifier 250, the metadata recording addressing information of the read request, and the metadata set including metadata of access requests for the storage device during a past period. The controlling unit 930 is configured to: in response to finding, by the searching unit 920, the metadata of the read request in the metadata set, determine, based on the metadata, the cached page of the second container storing the data. The providing unit 940 is configured to: in response to determining, by the controlling unit 930, the cached page of the second container storing the data, provide 220 the cached page from the second container to the first container thereby avoiding 270 reading the data from the storage device.

In some embodiments, the controlling unit 930 may be further configured to: in response to failing to find, by the searching unit 920, metadata in the metadata set, read the data from the storage device and add the metadata into the metadata set.

In some embodiments, the obtaining unit 910 may be further configured to: translate the virtual device identifier and the virtual logical block number associated with the read request into a real device identifier and a real logical block number associated with the read request.

In some embodiments, the searching unit 920 may be further configured to: select an index table corresponding to the real device identifier; and use the real logical block number as a key to look up metadata in the index table.

In some embodiments, the metadata may include metadata at the block layer and metadata at the file layer.

In some embodiments, the providing unit 940 may be further configured to: duplicate or migrate the cached page from the second container into the first container.

In some embodiments, the providing unit 940 may be further configured to: determine whether to duplicate or migrate the cached page into the first container based on at least one of an access frequency of the cached page, an access characteristic of the cached page and the remaining space of the memory that the cached page resides in.

In some embodiments, the controlling unit 930 may be further configured to: if the cached page is duplicated from the second container into the first container, add the metadata into the metadata set; and if the cached page is migrated from the second container into the first container, modify the metadata set with the metadata.

In some embodiments, the providing unit 940 may be further configured to: in response to the cached page being modified or deleted in the first container after being migrated into the first container, return the cached page to the second container.

In some embodiments, the providing unit 940 may be further configured to: in response to the cached page of the second container storing the data and the state of the cached page being clean, provide 220 the cached page from the second container to the first container.

In some embodiments, the controlling unit 930 may be further configured to: in response to the cached page of the second container storing the data and the state of the cached page being dirty, delete the metadata associated with the cached page in the metadata set; read the data from the storage device; and add the metadata of the read request to the metadata set.

Figure 10:
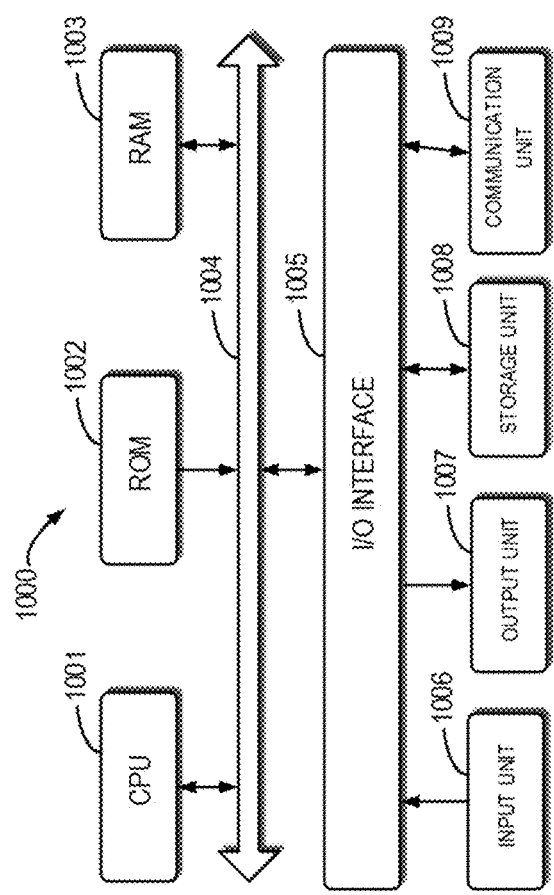
FIG. 10 is a schematic block diagram illustrating a device that may be used to implement embodiments of the present disclosure.

FIG. 10 is a block diagram illustrating a device 1000 that may be used to implement embodiments of the present disclosure. As illustrated in FIG. 10, the device 1000 includes a central processing unit (CPU) 1001, which can execute various appropriate actions and processing based on the computer program instructions stored in a read-only memory (ROM) 1002 or the computer program instructions loaded into a random access memory (RAM) 1003 from a storage unit 1008. The RAM 1003 also stores all kinds of programs and data required by operating the device 1000. The CPU 1001, ROM 1002 and RAM 1003 are connected to each other via a bus 1004, to which an input/output (I/O) interface 1005 is also connected.

A plurality of components in the device 1000 are connected to the I/O interface 1005, including: an input unit 1006, such as a keyboard, a mouse and the like; an output unit 1007, such as various types of displays, loudspeakers and the like; a storage unit 1008, such as a storage disk, an optical disk and the like; and a communication unit 1009, such as a network card, a modem, a wireless communication transceiver and the like. The communication unit 1009 allows the device 1000 to exchange information/data with other devices through computer networks such as Internet and/or various telecommunication networks.

Each procedure and processing described above, such as the method 300, can be executed by the processing unit 1001. For example, in some embodiments, the method 300 can be implemented as computer software programs, which are tangibly included in a machine-readable medium, such as the storage unit 1008. In some embodiments, the computer program can be partially or completely loaded and/or installed to the device 1000 via ROM 1002 and/or the communication unit 1009. When the computer program is loaded to the RAM 1003 and executed by the CPU 1001, one or more steps of the above described method 300 are implemented.

Compared with the existing method of reading data from a container of a storage system, the storage system and storage method according to the embodiments of the present disclosure achieve a storage system and a method with high performance and high efficiency by utilizing block-layer data sharing, at least providing the following technical advantages: first, the embodiments of the present disclosure provide detection and reduction of redundant read requests of the storage device. By using a small amount of metadata, embodiments achieve detection of redundant read requests before data is retrieved from the storage device. Moreover, in the embodiments of the present disclosure, by means of duplication or migration, content of the cached page already existing in other containers may be utilized to serve for the redundant read requests being detected.

In addition, the embodiments of the present disclosure may process repetitive duplicates of a cached page in the memory. When redundant read requests are found, the embodiments may migrate the cached page between containers to avoid generating repetitive cached pages in the memory. Particularly, when the memory space is insufficient, the embodiments may swap out repetitive cached pages to obtain more memory space.

In addition, the embodiments of the present disclosure may achieve a trade-off self-adaptively between IO performance and memory efficiency. The embodiments may weigh between IO performance and memory efficiency by managing the number of repetitive cached pages reasonably. In particular, the embodiments may determine the number of repetitive cached pages based on one or a combination of the access frequency of the cached page, the access characteristic of the cached page and the remaining space of the memory that the cached page resides in.

Furthermore, the embodiments of the present disclosure may be implemented by a flexible add-on module. The fast look-aside buffer provided by the embodiments may be a kernel module cooperating with the block storage driver and can be loaded/unloaded flexibly. The fast look-aside buffer provided by the embodiments almost reuses all the infrastructure of the existing block storage driver and reduces the risk of redesign or protects the existing investment. As an enhanced infrastructure, the embodiments of the present disclosure may be further applied to a converged system or a hyper-converged system, a cloud system (such as VirtuStream), or any other block-shared system, or even an environment out of container technical environment.

As used herein, the term "includes" and its variants are to be read as open-ended terms that mean "includes, but is not limited to." The term "based on" is to be read as "based at least in part on." The term "one example embodiment" or "the example embodiment" is to be read as "at least one embodiment." Terms "first," "second" and others can denote different or identical objects. The following text may also contain other explicit or implicit definitions.

As used herein, the term "determine" covers various actions. For example, "determine" may include computing, calculating, processing, deriving, examining, searching for (such as search in a table, a database or another data structure), finding out and so on. Furthermore, "determine" may include receiving (such as receiving information), accessing (such as access data in a memory) and so on. Meanwhile, "determine" may include analyzing, choosing, selecting, creating and the like.

It should be noted that the embodiments of the present disclosure can be implemented in software, hardware, or a combination thereof. The hardware part can be implemented by a special logic; the software part can be stored in a memory and executed by a suitable instruction execution system such as a microprocessor or a dedicated designed hardware. One of ordinary skill in the art may understand that the above method and system may be implemented with computer executable instructions and/or in processor-controlled code, for example, such code is provided on such as a programmable memory or a data bearer such as an optical or electronic signal bearer.

Furthermore, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It should also be noted that the features and functions of the above described two or more apparatuses may be embodied in one apparatus. In turn, the features and functions of the above described one apparatus may be further embodied in a plurality of apparatuses.

Although the present disclosure has been described with reference to various embodiments, it is to be understood that the present disclosure is not limited to the disclosed embodiments. The present disclosure is intended to cover various modifications and equivalent arrangements included in the spirit and scope of the appended claims.

We claim:

1. A computer-implemented method, comprising:
   in response to receiving a read request of a first container for data in a storage device, obtaining an identifier associated with the read request;
   searching for metadata of the read request in a metadata set based on the identifier, the metadata recording addressing information of the read request, the metadata set comprising metadata of access requests for the storage device during a past period; and
   in response to finding the metadata of the read request in the metadata set,
      determining, based on the metadata, a cached page of a second container storing the data; and
      providing the cached page from the second container to the first container to avoid reading the data from the storage device;
   wherein obtaining the identifier associated with the read request comprises:
   translating a virtual device identifier and a virtual logical block number associated with the read request into a real device identifier and a real logical block number associated with the read request.

2. The method according to claim 1, further comprising:
   in response to failing to find the metadata in the metadata set, reading the data from the storage device; and
   adding the metadata into the metadata set.

3. The method according to claim 1, wherein searching for the metadata of the read request in the metadata set based on the identifier comprises:
   selecting an index table corresponding to the real device identifier; and
   using the real logical block number as a key to look up the metadata in the index table.

4. The method according to claim 1, wherein the metadata comprises metadata at a block layer and metadata at a file layer.

5. The method according to claim 1, wherein providing the cached page from the second container to the first container comprises:
   duplicating or migrating the cached page from the second container to the first container.

6. The method according to claim 5, further comprising:
   determining whether to duplicate or migrate the cached page to the first container based on at least one of an access frequency of the cached page, an access characteristic of the cached page, and remaining space of a memory that the cached page resides in.

7. The method according to claim 5, further comprising:
   if the cached page is duplicated from the second container to the first container, adding the metadata to the metadata set; and
   if the cached page is migrated from the second container to the first container, modifying the metadata set with the metadata.

8. The method according to claim 5, further comprising:
   in response to the cached page being modified or deleted in the first container after being migrated to the first container, returning the cached page to the second container.

9. The method according to claim 1, further comprising:
   in response to the cached page of the second container storing the data and a state of the cached page being clean, providing the cached page from the second container to the first container.

10. The method according to claim 1, further comprising:
    in response to the cached page of the second container storing the data and a state of the cached page being dirty,
       deleting metadata associated with the cached page in the metadata set;
       reading the data from the storage device; and
       adding the metadata of the read request to the metadata set.

11. An apparatus for a storage system, comprising:
    at least one processor; and
    at least one memory storing computer program instructions, the at least one memory and the computer program instructions being configured to, with the at least one processor, cause the apparatus to:

in response to receiving a read request of a first container for data in a storage device, obtain an identifier associated with the read request;

search for metadata of the read request in a metadata set based on the identifier, the metadata recording addressing information of the read request, the metadata set including metadata of access requests for the storage device during a past period; and in response to finding the metadata of the read request in the metadata set,
determine, based on the metadata, a cached page of a second container storing the data; and
provide the cached page from the second container to the first container to avoid reading the data from the storage device;

wherein obtaining the identifier associated with the read request comprises:
translating a virtual device identifier and a virtual logical block number associated with the read request into a real device identifier and a real logical block number associated with the read request.

12. The apparatus according to claim 11, wherein the at least one memory and the computer program instructions are further configured to, with the at least one processor, cause the apparatus to:
in response to failing to find the metadata in the metadata set, read the data from the storage device; and
add the metadata into the metadata set.

13. The apparatus according to claim 11, wherein the at least one memory and the computer program instructions are further configured to, with the at least one processor, cause the apparatus to:
select an index table corresponding to the real device identifier; and
use the real logical block number as a key to look up the metadata in the index table.

14. The apparatus according to claim 11, wherein the metadata comprises metadata at a block layer and metadata at a file layer.

15. The apparatus according to claim 11, wherein the at least one memory and the computer program instructions are further configured to, with the at least one processor, cause the apparatus to:
duplicate or migrate the cached page from the second container to the first container.

16. The apparatus according to claim 15, wherein the at least one memory and the computer program instructions are further configured to, with the at least one processor, cause the apparatus to:
determine whether to duplicate or migrate the cached page to the first container based on at least one of an access frequency of the cached page, an access characteristic of the cached page, and remaining space of a memory that the cached page resides in.

17. The apparatus according to claim 15, wherein the at least one memory and the computer program instructions are further configured to, with the at least one processor, cause the apparatus to:
if the cached page is duplicated from the second container to the first container, add the metadata to the metadata set; and
if the cached page is migrated from the second container to the first container, modify the metadata set with the metadata.

18. The apparatus according to claim 15, wherein the at least one memory and the computer program instructions are further configured to, with the at least one processor, cause the apparatus to:
in response to the cached page being modified or deleted in the first container after being migrated to the first container, return the cached page to the second container.

19. A computer program product comprising a non-transitory processor-readable storage medium having stored therein program code of one or more software programs, wherein the program code when executed by at least one processing device causes the at least one processing device to:
in response to receiving a read request of a first container for data in a storage device, obtain an identifier associated with the read request;
search for metadata of the read request in a metadata set based on the identifier, the metadata recording addressing information of the read request, the metadata set including metadata of access requests for the storage device during a past period; and
in response to finding the metadata of the read request in the metadata set,
determine, based on the metadata, a cached page of a second container storing the data; and
provide the cached page from the second container to the first container to avoid reading the data from the storage device;
wherein obtaining the identifier associated with the read request comprises:
translating a virtual device identifier and a virtual logical block number associated with the read request into a real device identifier and a real logical block number associated with the read request.

20. The computer program product according to claim 19, wherein the program code when executed by the at least one processing device further causes the at least one processing device to:
select an index table corresponding to the real device identifier; and
use the real logical block number as a key to look up the metadata in the index table.

* * * * *